United States Patent Office 3,591,695
Patented July 6, 1971

3,591,695
ANTIDEPRESSANTS METHODS AND COMPOSITIONS OF 4 - PHENYL-3,4-DIHYDROQUINAZOLINES
Hans Ott, Basel-Land, Switzerland, assignor to Sandoz-Wander, Inc., Hanover, N.J.
No Drawing. Continuation-in-part of application Ser. No. 557,370, June 14, 1966. This application Aug. 15, 1969, Ser. No. 850,669
Int. Cl. A61k 27/00
U.S. Cl. 424—251                                   7 Claims

ABSTRACT OF THE DISCLOSURE

Disclosed are pharmaceutical compositions and method for effecting central nervous systems stimulation and utilizing, as the active pharmaceutical agent, a compound of the class of 4-phenyl-3,4-dihydroquinazolines.

This application is a continuation-in-part of copending application Ser. No. 557,370 filed June 14, 1966, now abandoned.

The present invention is directed to the use as CNS (central nervous system) stimulants and antidepressants of 4-phenyl-3,4-dihydroquinazolines of the Formula I:

[Structure I]

wherein
R is unsubstituted phenyl or phenyl substituted in at most two of m- and p-positions with chlorine or lower alkyl, e.g. methyl, ethyl and propyl; or in one of the m- or p-positions by lower alkoxy, e.g. methoxy and ethoxy; and
ring A is either unsubstituted or is substituted in at most two of the 6- and 7-positions with chlorine or bromine or in one of the 6- or 7-positions with lower alkoxy, e.g. methoxy and ethoxy; and their pharmaceutically acceptable acid addition salts.

Compounds I are prepared from their corresponding quinazolines II by addition thereto of either a Grignard reagent III or an organic lithium compound IV according to the following reaction schemes:

$$\text{II} + \text{RMgX} \longrightarrow \text{I} \qquad A$$

$$\text{II} + \text{RLi} \longrightarrow \text{I} \qquad B$$

wherein
X is either an iodine, a bromine or a chlorine atom; and
R and ring A have their above-ascribed meanings.

The reaction takes place across the 3,4-CN double bond in a known manner.

Quinazolines II are either available compounds or are readily prepared by established procedures known to those skilled in the art from available starting material. A convenient method for preparing compounds II is in accord with the following reaction scheme:

[Scheme C: V → Va → II]

Likewise, compounds III are prepared from known starting materials according to reaction scheme D and compounds IV are similarly prepared in accordance with reaction scheme E:

$$\text{R—X} + \text{Mg} \longrightarrow \text{III} \qquad D$$
$$\text{VI}$$
$$\text{R—X'} + \text{R'Li} \longrightarrow \text{IV} \qquad E$$
$$\text{VII} \quad \text{VIII}$$

wherein
R' is n-butyl;
X' is either a chlorine atom or a bromine atom; and each of R and ring A has its above-ascribed meaning.

Compounds I and their pharmaceutically acceptable acid addition salts are CNS-active compounds and are useful as such. In particular, the compounds are CNS stimulants and useful as anti-depressants as indicated by behavior tests in mice and by showing a delayed potentiation of DOPA in mice. Many compounds of the invention as represented by the title compounds of Examples 1, 2 and 5 also reverse reserpine in mice. In general these responses are obtained in animals at daily dosages of from 0.2 to 70 milligrams per kilogram of body weight. In addition some of the compounds have further advantageous pharmacological properties. For example, the title compound of Example 3 is useful as an analgesic as indicated in the narcotic-type analgesia test in mice and such response may also be obtained at the above-indicated dosages.

Compounds I and their pharmaceuticaly acceptable acid addition salts are administered either orally or parenterally in standard dosage forms, e.g., tablets, hard or soft capsules, emulsions, syrups and elixirs. Daily dosages for treating metal disorders involving depression in warm-blooded animals suffering from depression will range from 10 to 200 milligrams, administered orally either as a single dose or in divided dosages of from 5 to 100 milligrams each and from 2 to 4 times per day.

Among the pharmaceutically acceptable acid addition salts are salts of organic acids, e.g., tartaric acid; inorganic acids, e.g., hydrochloride acid, hydrobromic acid and sulfuric acid; monobasic acids, e.g., an alkanesulfonic acid, such as methanesulfonic acid ($H_3C$—$SO_3H$); dibasic acids, e.g., succinic acids; tribasic acids, e.g., phosphoric acid and citric acid; saturated acids, e.g., acetic acid; ethylenically unsaturated acids, e.g., maleic acid and fumaric acid; and aromatic acids, e.g., salicyclic acid and arylsulfonic acids, such as benzenesulfonic acid. The only limitation on the acid selected is that the resulting acid addition salts be pharmaceutically acceptable; the acid does not nullify the therapeutic properties of compounds I.

The said dosage may be suitable for oral use for example as tablets, aqueous or oily suspensions, dispersable powders or granules, emulsions, hard or soft capsules, or syrups or elixirs.

Compositions intended for oral use may be prepared according to any method known to the art for the manufacture of pharmaceutical compositions and such compositions may contain one or more agents selected from the group consisting of sweetening agents, flavoring agents, coloring agents and preserving agents in order to provide an elegant and palatable preparation.

The said tablets contain the active ingredient in admixture with non-toxic pharmaceutical excipients known to be suitable in the manufacture of tablets. Suitable pharmaceutical excipients may be, for example, inert diluents, for example calcium carbonate, sodium carbonate, lactose, calcium phosphate or sodium phosphate, granulating and disintegrating agents, for example maise starch, or alginic acid, binding agents for example starch, gelatine or acacia and lubricating agents, for example magnesium stearate, stearic acid or talc. The tablets may be uncoated or they may be coated by known techniques to delay distintegration and absorption in the gastro-intestinal tract and thereby provide a sustained cation over a longer period.

The said tablet compositions may be formulated so that for every 600 parts by weight of the composition there are present between 5 and 95 parts by weight of active ingredient (compound I or acid addition salt thereof) and preferably between 25 and 85 parts by weight of the active ingredient.

The said aqueous suspensions contain the active ingredient in admixture with excipients known to be suitable in the manuafcture of aqueous suspensions. Suitable excipients may be, for example suspending agents, for example sodium carboxymethylcellulose, methylcellulose, hydroxypropylmethylcellulose, sodium alginate, polyvinylpyrrolidone, gum tragacanth and gum acacia. Dispersing or wetting agents may be naturally-occurring phoesphatide, for example lecithin, or condensation products of ethylene oxide with fatty acids, for example polyoxyethylene stearate, or condensation products of ethylene oxide with long chain aliphatic alcohols, for example heptadeca-ethyleneoxycetanol, or condensation products of ethylene oxide with partial esters derived from fatty acids and a hexitol, for example polyoxyethylene sorbitol mono-oleate, or condensation products of ethylene oxide with partial esters derived from fatty acids and hexitol anhydrides, for example polyoxyethylene sorbitan mono-oleate. The said aqueous suspensions may also contain on or more preservatives for example ethyl or n-propyl p-hydroxybenzoate, one or more flavoring agents and one or more sweetening agents such as sucrose, saccharin or sodium cyclamate.

Oily suspensions may be formulated by suspending the active ingredient in a vegetable oil, for example arachis oil, olive oil, sesame oil or coconut oil, or in a mineral oil such as liquid paraffin, and the said oily suspensions may contain a thickening agent, for example beeswax, hard paraffin or cetyl alcohol. Sweetening agents, for example sugar, sodium saccharin or sodium cyclamate, and flavoring agents, for example caramel, may be added to provide a palatable oral preparation. These compositions may be preserved by the addition of an anti-oxidant such as propyl gallate or ascorbic acid.

Dispersible powders and granules suitable for the extemporaneous preparation of an aqueous suspension by the addition of water contain the active ingredient in admixture with a dispersing or wetting agent, suspending agent and one or more preservatives. Suitable dispersing or wetting agents and suspending agents are those mentioned above in the descrpition of aqueous suspension formulations. Additional excipients, for example sweetening, flavoring and coloring agents, may optionally also be present.

The pharmaceutical compositions of the invention may also be in the form of oil-in-water type emulsions. The oily phase may be a vegetable oil, for example, olive oil or arachis oils, or a mineral oil for example liquid paraffin or mixtures of these. Suitable emulsifying agents may be naturally-occurring gums, for example gum acacia or gum tragacanth, naturally-occurring phosphatides, for example soya bean lecithin, and esters or partial esters derived from fatty acids and hexitol anhydrides, for example sorbitan monooleate, and condensation products of the said partial esters with ethylene oxide, for example polyoxyethylene sorbitan mono-oleate. The emulsions may optionally contain sweetening and flavoring agents.

Formualtions for oral use may be presented as hard gelatin capsules wherein the active ingredient is mixed with an inert solid diluent, for example calcium carbonate, calcium phosphate, kaolin, lactose, maize starch, and a lubricant, such as magnesium stearate or stearic acid or as soft gelatin capsules wherein the active ingredient is mixed with an oily medium, for example arachis oil, liquid paraffin or olive oil.

Syrups and elixirs may be formulated with sweetening agents, for example glycerol, sorbitol or sucrose. Such formulations may also contain a demulcent, a preservative and flavoring and coloring agents.

The pharmaceutical dosage form may be in the form of a sterile injectable preparation for example as a sterile injectable aqueous suspension. This suspension may be formulated according to the known art using those suitable dispersing or wetting agents and suspending agents which have been mentioned above.

The sterile injectable preparation may also be a sterile injectable solution or suspension in a non-toxic parenterally-acceptable diluent or solvent for example as a solution in 1:3-butane diol. Suitable solubilizing agents may be added, such as polyoxyethylene (20) sorbitan monooleate.

The active ingredient in the pharmaceutical compositions, as mentioned above, may be a new compound and those new compounds form an additional feature of this invention.

In the examples which follow, the parts and percentages are by weight unless otherwise specified and the temperatures are in degrees centigrade. The relationship between parts by weight and parts by volume is the same as that between the kilogram and the liter.

EXAMPLE 1

4-phenyl-3,4-dihydroquinazoline

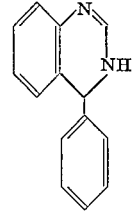

Add dropwise (within a period of from 5 to 10 minutes) 50 parts by volume of a 2 molar solution of phenyl lithium in benzene/diethylether to a solution of 12.6 parts of quinazoline in 190 parts by volume of benzene. (The temperature rises to from 50° to 60°.) Heat the thus-obtained reaction mixture for an additional fifteen minutes at 50°. Extract the resulting benzene solution three times with water, dry the obtained organic phase over anhydrous sodium sulfate, filter the dried organic phase through cotton wool and concentrate the thus-filtered benzene solution to crystallize the title compound, melting point (M.P.) 164° to 166°.

Replacing the phenyl lithium by an equivalent of either m-chlorophenyl lithium, m-methoxyphenyl lithium, m-ethylphenyl lithium, m-tolyl lithium or 3,4-dimethylphenyl lithium results in the preparation in similar manner of 4-m-chlorophenyl-3,4- dihydroquinazoline, 4-m-methoxyphenyl-3,4-dihydroquinazoline, 4-m-ethylphenyl-3,4-dihydroquinazoline, 4-m-tolyl-3,4-dihydroquinazoline and 4(3,4-dimethylphenyl)-3,4-dihydroquinazoline, respectively.

EXAMPLE 2

4-p-chlorophenyl-3,4-dihydroquinazoline

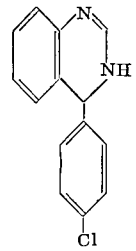

Cover 7.3 parts of magnesium turnings (activated with iodine) with 80 parts by volume of diethylether. Start the Grignard reaction by dropping into the resulting mixture (under stirring and heating) a small portion of a solution of 38.4 parts by volume of 1-bromo-4-chlorobenzene in 150 parts by volume of diethylether. Add the remainder of the halide solution at a sufficient rate to keep the reaction mixture boiling. In order to complete the reaction, reflux the thus-obtained mixture for an additional 30 minutes. Add to the thus-prepared Grignard solution 25 parts of quinazoline in 150 parts by volume of diethylether within a period of fifteen minutes (under stirring and external cooling). Continue stirring at room temperature (20°) for 30 minutes. Decompose the reaction mixture by adding water thereto. Thereafter separate the organic layer from the water layer and extract the latter once with diethylether. Dry the combined organic phases over sodium sulfate, filter through cotton wool and evaporate the obtained filtrate to dryness in vacuo. Crystallize the thus obtained residue from ethylacetate to yield the title compound as white prisms, M.P. 160° to 161°.

Replacing the quinazoline with an equivalent of either 7-chloroquinazoline, 6-ethoxyquinazoline, 6-bromoquinazoline or 6-methoxyquinazoline results in the preparation, in similar manner of 7-chloro-4-p-chlorophenyl-3,4-dihydroquinazoline, 6 - ethoxy-4-p-chlorophenyl-3,4-dihydroquinazoline, 6-bromo-4-p-chlorophenyl - 3,4 - dihydroquinazoline and 6-methoxy-4-p-chlorophenyl-3,4-dihydroquinazoline.

EXAMPLE 3

6-chloro-4-phenyl-3,4-dihydroquinazoline

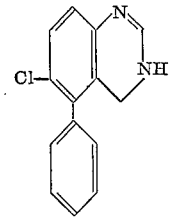

Add dropwise (within a period of ten minutes) 16 parts by volume of a 20% solution of phenyl lithium in benzene/diethylether to a solution of 5 parts of 6-chloroquinazoline in 100 parts by volume of diethylether (under stirring). Continue stirring for an additional 30 minutes at 30° to 35°. Extract the resulting solution three times with water, dry the obtained organic phase over anhydrous sodium sulfate, filter the dried organic phase through cotton wool and evaporate the thus-filtered solution to dryness. Crystallize the residue (title compound) from ethylacetate to obtain white prisms, M.P. 162° to 164°.

Replacing the 6-chloroquinazoline with an equivalent of either 7-chloroquinazoline, 6,7-dichloroquinazoline, 6-bromoquinazoline, 7-bromoquinazoline or 6-methoxyquinazoline results in the preparation, in similar manner, of 7-chloro-4-phenyl-3,4-dihydroquinazoline, 6,7-dichloro-4-phenyl-3,4-dihydroquinazoline, 6 - bromo-4-phenyl-3,4-dihydroquinazoline, 7-bromo-4-phenyl-3,4-dihydroquinazoline and 6-methoxy-4-phenyl-3,4-dihydroquinazoline, respectively.

EXAMPLE 4

4-p-methoxyphenyl-3,4-dihydroquinazoline

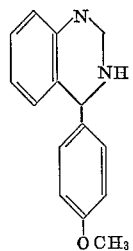

Cover 3.1 parts of magnesium turnings (activated with iodine) with 40 parts by volume of diethylether. Add the remainder of the p-bromoanisol solution at a sufficient rate to maintain the boiling of the reaction mixture. Reflux the resultant for an additional 30 minutes to complete the reaction.

To the thus-obtained Grignard solution add dropwise (within a period of thirty minutes) a solution of 10 parts of quinazoline in 50 parts by volume of diethylether (under stirring and external cooling). Decompose the resulting reaction mixture by adding water thereto. Thereafter separate the organic layer from the water layer and extract the latter once with diethylether. Dry the combined organic phases over sodium sulfate, filter the dried material through cotton wool and evaporate the obtained filtrate to dryness in vacuo. Crystallize the title compound, M.P. 134° to 135°, from ethylacetate.

Replacing the quinazoline with an equivalent of either 7-methoxyquinazoline, 7-ethoxyquinazoline or 7-bromoquinazoline results in the preparation in similar manner of 7-methoxy-4-p-methoxyphenyl - 3,4 - dihydroquinazoline, 7-ethoxy-4-p-methoxyphenyl-3,4-dihydroquinazoline and 7-bromo-4-p-methoxyphenyl-3,4-dihydroquinazoline.

EXAMPLE 5

4-p-tolyl-3,4-dihydroquinazoline

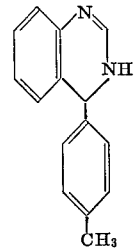

Cover 3 parts of magnesium turnings (activated with iodine) with 40 parts by volume of diethylether. Start the Grignard reaction by adding dropwise to the resulting mixture (under stirring and heating) a small part of a solution of 13 parts of p-bromotoluene at a sufficient rate to maintain the boiling of the reaction mixture. Reflux the resultant for an additional 30 minutes in order to complete the reaction.

Add dropwise to the thus-prepared Grignard solution a solution of 9 parts of quinazoline in 50 parts by volume of diethylether (under stirring and external cooling). Reflux the thus-obtained reaction mixture for 30 minutes. Then decompose same by adding water thereto. Thereafter separate the organic layer from the water layer and extract the latter once with diethylether. Dry the organic phases over sodium sulfate, filter through cotton wool and evaporate the obtained filtrate to dryness in vacuo. Crystallize the residue from ethylacetate/diethylether to obtain the title compound, M.P. 148° to 150°.

Replacing the quinazoline with an equivalent of either 7-chloro-quinazoline, 6-ethoxyquinazoline,, 6-bromoquinazoline or 6-methoxyquinazoline results in the preparation, in similar manner, of 7-chloro-4-p-tolyl-3,4-dihydroquinazoline, 6-ethoxy-4-p-tolyl-3,4-dihydroquinazoline, 6-methoxy-4-p-3,4-dihydroquinazoline, respectively.

EXAMPLE 6

Quinazoline

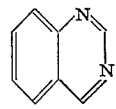

Intimately mix 7 parts of α-α-diformamido-o-nitrotoluene (prepared by heating 2-nitrobenzaldehyde with formamide initially at from 40° to 50°, in a current of dry hydrogen chloride; maintaining the temperature of about 80° for 1 hour; triturating the product with ice-cold ethanol; and working up) with 20 parts of zinc dust and 80 parts of crushed ice. Add slowly thereto 30 parts by volume of glacial acetic acid (with continuous stirring) over a period of 10 minutes. Permit the mixture to come to room temperature (20°); stir said mixture for 2 hours with frequent additions of small quantities of zinc dust; filter resultant; make the filtrate alkaline with sodium hydroxide; extract the obtained alkaline filtrate with diethylether; and evaporate the diethylether to obtain the title compound.

The preceding method is published [Sidhu et al., Indian J. Chem., 1 (8), 346 and 347, 1963; Chemical Abstracts, 60, 524 a–d, 1964].

Replacing the 2-nitrobenzaldehyde with an equivalent of each of the starting materials A results in the preparation, in similar manner, of the coresponding quinazoline B in the following table:

| A | B |
|---|---|
| 4-chloro-2-nitrobenzaldehyde | 7-chloroquinazoline |
| 5-chloro-2-nitrobenzaldehyde | 6-chloroquinazoline |
| 4,5-dichloro-2-nitrobenzaldehyde | 6,7-dichloroquinazoline |
| 4-bromo-2-nitrobenzaldehyde | 7-bromoquinazoline |
| 5-bromo-2-nitrobenzaldehyde | 6-bromoquinazoline |
| 4-methoxy-2-nitrobenzaldehyde | 7-methoxyquinazoline |
| 5-methoxy-2-nitrobenzaldehyde | 6-methoxyquinazoline |
| 4-ethoxy-2-nitrobenzaldehyde | 7-ethoxyquinazoline |
| 5-ethoxy-2-nitrobenzaldehyde | 6-ethoxyquinazoline |

EXAMPLE 7

Granulate a mixture of 125 parts of the title compound of Example 1 and 50 parts of lactose with a sufficient quantity of water and to the resultant add 200 parts of maize starch. Pass the obtained mass through a 16 mesh screen. Then dry the prepared granules in a current of air at a temperature not exceeding 65°. Pass the thus-dried granules through a 16 mesh screen, and mix the screened material with 7.5 parts of magnesium stearate prior to compressing into tablets. There are thus obtained tablets suitable for oral administration.

Replacing the title compound of Example 1 with that of any of Examples 2 to 5 or a pharmaceutically acceptable acid addition salt, e.g. the acid maleate, thereof, also results in the preparation of suitable tablets.

EXAMPLE 8

Ball-mill a mixture of 5.5 parts of the title compound of Example 2, 3 parts of calcium salt of lignin sulfonic acid and 237 parts by volume of water until the size of substantially all of the particles of 4-p-chlorophenyl-3,4-dihydroquinazoline is less than 10 microns. Dilute the obtained suspension with a solution containing 3 parts of sodium carboxymethylecellulose and 0.9 parts of the butyl ester of p-hydroxybenzoic acid in 300 parts by volume of water. An aqueous suspension suitable for oral administration is thus obtained.

EXAMPLE 9

Mix a mixture of 30 parts of the title compound of Example 3, 202 parts of maize starch and 35 parts of alginic acid with a sufficient quantity of 10% aqueous paste of maize starch, and granulate the resultant. Dry the granules in a current of warm air before passing them through a 16 mesh screen. Mix the screened granules with 5 parts of magnesium stearate. Compress the obtained admixture into tablet form. There are thus obtained tablets suitable for oral administration.

EXAMPLE 10

Granulate a mixture of 10 parts of the title compound of Example 4, 37 parts of maize starch and 10 parts of gum acacia with a sufficient quantity of water. Pass the resulting mass through a 12 mesh screen, and dry the obtained granules in a current of warm air. Pass the dried granules through a 16 mesh screen before mixing them with 3 parts of magnesium stearate. Then compress the resulting mixture into tablet form.

EXAMPLE 11

Mix 0.5 part of the title compound of Example 5 in a finely divided form with 12 parts of powdered gum acacia, 0.8 part of powdered tragacanth and 0.4 part of elixir of saccharin. Mix the resultant with 50 parts by volume of arachis oil. Mix the obtained oily suspension with 50 parts of water to obtain an emulsion suitable for oral administration.

The invention is readily understood from the foregoing description. Various changes may be made in the preparation of the active compounds and in the make-up of the compounds and the dosage forms for their use without departing from the spirit and scope of the invention or sacrificing its material advantages. The examples merely provide illustrative embodiments.

What is claimed is:

1. A method of treating mental disorders involving depression comprising orally administering to a warm-blooded animal affected by depression an active ingredient selected from the group consisting of (a) a compound of the formula:

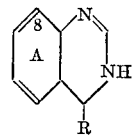

wherein
R is a member selected from the group consisting of unsubstituted phenyl, and phenyl substituted in at most two of the m- and p-positions by chlorine or lower alkyl or in one of the m- or p-positions by lower alkoxy; and
ring A is either unsubstituted or substituted in at most two of the 6- and 7-positions with chlorine or bromine or in one of the 6- or 7-positions by lower alkoxy; and
(b) a pharmaceutically acceptable acid addition salt of (a), in daily dosage of from 10 milligrams to 200 milligrams of said active ingredient.

2. A process according to claim 1 wherein the active ingredient is 4-phenyl-3,4-dihydroquinazoline.

3. A process according to claim 1 wherein the active ingredient is 4-p-chlorophenyl-3,4-dihydroquinazoline.

4. A process according to claim 1 wherein the active ingredient is 6-chloro-4-phenyl-3,4-dihydroquinazoline.

5. A process according to claim 1 wherein the active ingredient is 4-p-methoxyphenyl-3,4-dihydroquinazoline.

6. A process according to claim 1 wherein the active ingredient is 4-p-tolyl-3,4-dihydroquinazoline.

7. A pharmaceutical composition in unit dosage form for treatment of depression in warm-blooded animals affected by depression and adapted for oral administration comprising in intimate admixture an inert, solid, non-toxic pharmaceutically acceptable carrier and between 5 milligrams to 100 milligrams of an active ingredient of claim 1.

References Cited

Smith, Chem. Abst., 55: 8410h (1961).
Lora-Tamayo, Chem Abst., 63: 5643h (1965).
Schonfield, J. Chem. Soc., p. 1927 (1952).

STANLEY J. FRIEDMAN, Primary Examiner